US00RE46704E

(19) United States
(12) Reissued Patent
Kuure et al.

(10) Patent Number: US RE46,704 E
(45) Date of Reissued Patent: Feb. 6, 2018

(54) METHOD FOR ESTABLISHING PACKET-SWITCHED CONNECTION, AND CELLULAR NETWORK UTILIZING THE METHOD, AND CELLULAR TERMINAL

(71) Applicant: Nokia Corporation, Espoo (FI)

(72) Inventors: Pekka Kuure, Espoo (FI); Markku Vimpari, Oulu (FI); Jari Vallstrom, Oulu (FI); Timo Vittaniemi, Oulu (FI); Hannu Toyryla, Helsinki (FI)

(73) Assignee: Nokia Technologies Oy, Espoo (FI)

(21) Appl. No.: 13/865,398

(22) Filed: Apr. 18, 2013

Related U.S. Patent Documents

Reissue of:
(64) Patent No.: 8,203,974
Issued: Jun. 19, 2012
Appl. No.: 10/727,726
Filed: Dec. 4, 2003

(30) Foreign Application Priority Data

Dec. 13, 2002 (FI) ..... 20022195

(51) Int. Cl.

| | |
|---|---|
| ***H04L 12/16*** | (2006.01) |
| ***H04H 20/71*** | (2008.01) |
| ***H04W 76/04*** | (2009.01) |
| ***H04M 3/56*** | (2006.01) |
| *H04W 4/10* | (2009.01) |
| *H04W 72/00* | (2009.01) |
| *H04W 76/00* | (2009.01) |
| *H04L 29/06* | (2006.01) |
| *H04L 12/18* | (2006.01) |

(52) U.S. Cl.
CPC ..... *H04W 76/045* (2013.01); *H04M 3/56* (2013.01); *H04L 12/1827* (2013.01); *H04L 65/4038* (2013.01); *H04W 4/10* (2013.01); *H04W 72/005* (2013.01); *H04W 76/005* (2013.01)

(58) Field of Classification Search
CPC .. H04M 3/56; H04L 65/4038; H04L 12/1827; H04W 76/045; H04W 4/10; H04W 76/005; H04W 72/005
USPC ..... 370/260, 312
See application file for complete search history.

(56) References Cited

U.S. PATENT DOCUMENTS 5,553,190 A * 9/1996 Ohya et al. ..... 704/201
5,745,695 A * 4/1998 Gilchrist et al. ..... 370/330
5,959,982 A * 9/1999 Federkins et al. ..... 370/336
(Continued)

FOREIGN PATENT DOCUMENTS

EP 0 830 040 A2 3/1998
EP 0 830 040 A2 3/1998
(Continued)

*Primary Examiner* — Matthew Heneghan
(74) *Attorney, Agent, or Firm* — Harrington & Smith

(57) ABSTRACT

The invention relates to method applicable in a packet-switched cellular network for voice connections, by which method a new dedicated channel can be established quickly using the existing dedicated channel of the voice connection. The establishment of the new dedicated channel utilizes the previous dedicated channel the existence of which is extended by sending to at least the receiving terminals post-speech packets according to the invention. The post-speech packets produce a 2-second delay, approximately, which is sufficient to establish a new dedicated channel between terminals participating in a session.

32 Claims, 3 Drawing Sheets

(56) References Cited

U.S. PATENT DOCUMENTS

| | | | | |
|---|---|---|---|---|
| 6,003,089 | A * | 12/1999 | Shaffer et al. | 370/248 |
| 6,058,109 | A * | 5/2000 | Lechleider | 370/352 |
| 6,212,175 | B1 * | 4/2001 | Harsch | 370/338 |
| 6,243,579 | B1 * | 6/2001 | Kari | 370/320 |
| 6,324,188 | B1 * | 11/2001 | Tsuji | 370/537 |
| 6,377,814 | B1 * | 4/2002 | Bender | 370/311 |
| 6,466,544 | B1 | 10/2002 | Sen et al. | 370/231 |
| 6,480,891 | B1 * | 11/2002 | Chernyak et al. | 370/250 |
| 6,529,497 | B1 * | 3/2003 | Hjelm et al. | 370/347 |
| 6,577,862 | B1 * | 6/2003 | Davidson et al. | 370/433 |
| 6,600,928 | B1 * | 7/2003 | Ahya et al. | 455/416 |
| 6,614,797 | B1 * | 9/2003 | Hippelainen | 370/410 |
| 6,718,298 | B1 * | 4/2004 | Judge | 704/215 |
| 6,819,719 | B2 * | 11/2004 | Schelstraete | 370/259 |
| 6,873,604 | B1 * | 3/2005 | Surazski et al. | 370/271 |
| 6,907,030 | B1 * | 6/2005 | Bladsjo et al. | 370/349 |
| 6,940,826 | B1 * | 9/2005 | Simard et al. | 455/416 |
| 7,047,010 | B2 * | 5/2006 | Semper | 370/331 |
| 7,079,838 | B2 * | 7/2006 | Thomas et al. | 455/416 |
| 7,085,289 | B2 * | 8/2006 | Cromer et al. | 370/468 |
| 7,142,525 | B2 * | 11/2006 | Dolwin | 370/328 |
| 7,272,660 | B1 * | 9/2007 | Powers et al. | 370/338 |
| 7,406,096 | B2 * | 7/2008 | El-Maleh et al. | 370/466 |
| 7,408,948 | B2 * | 8/2008 | Lopponen et al. | 370/433 |
| 2001/0030949 | A1 | 10/2001 | Molno et al. | 370/329 |
| 2001/0030954 | A1 * | 10/2001 | Hameleers et al. | 370/338 |
| 2001/0055317 | A1 * | 12/2001 | Kajizaki et al. | 370/389 |
| 2002/0015398 | A1 * | 2/2002 | Kikinis | 370/338 |
| 2002/0045458 | A1 | 4/2002 | Parantainen et al. | 455/466 |
| 2002/0071415 | A1 * | 6/2002 | Soulabail et al. | 370/337 |
| 2002/0118650 | A1 * | 8/2002 | Jagadeesan et al. | 370/260 |
| 2002/0136170 | A1 * | 9/2002 | Struhsaker | 370/280 |
| 2002/0137516 | A1 * | 9/2002 | Hong et al. | 455/442 |
| 2002/0193113 | A1 * | 12/2002 | Sayeedi et al. | 455/439 |
| 2003/0139171 | A1 * | 7/2003 | Kuita | 455/411 |
| 2003/0153343 | A1 * | 8/2003 | Crockett et al. | 455/519 |
| 2004/0002351 | A1 * | 1/2004 | Upp et al. | 455/519 |
| 2004/0071126 | A1 * | 4/2004 | Ramos-Escano et al. | 370/349 |
| 2004/0196861 | A1 * | 10/2004 | Rinchiuso et al. | 370/441 |
| 2004/0203793 | A1 * | 10/2004 | Dorenbosch | 455/445 |

FOREIGN PATENT DOCUMENTS

| | | | |
|---|---|---|---|
| EP | 1 006 695 | A1 | 6/2000 |
| EP | 1 139 613 | A1 | 10/2001 |
| EP | 1 257 096 | A2 | 11/2002 |
| WO | WO-0079808 | A2 | 12/2000 |
| WO | WO-02/09463 | A1 | 1/2002 |
| WO | WO 02085051 | A1 * | 10/2002 |

* cited by examiner

METHOD FOR ESTABLISHING PACKET-SWITCHED CONNECTION, AND CELLULAR NETWORK UTILIZING THE METHOD, AND CELLULAR TERMINAL

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

TECHNICAL FIELD OF THE INVENTION

The invention relates to a method for creating a new packet-switched dedicated channel carrying speech samples in a cellular network, in which method communication occurs through a dedicated channel comprising both an uplink and at least one downlink and, in the core network interconnecting them, a server function/server controlling the flow of data packets. The invention also relates to a cellular network utilizing the method, a server/server function which realizes the method in the cellular network, a terminal utilizing the method in the cellular network, and a software means to implement the method.

BACKGROUND ART OF THE INVENTION

Circuit-switched voice connections over various telephone networks have been commonplace for over 100 years. With modern technology, people communicating over a voice connection can speak and listen to one another simultaneously because the communications connection is open in both directions continuously. As one party stops speaking, the other can continue at any point of time because the circuit-switched connection remains active all the time. The connection is terminated only when the parties so decide.

Communications connections, including voice connections, are increasingly packet-switched connections, like Internet connections, instead of being circuit-switched ones. One such packet-switched service/network is the GPRS (General Packet Radio Service) intended primarily for data communications. In a GPRS network, a communications connection is established only when there is data to transmit. An individual communications connection operates only in one direction at a time, either downlink towards the terminal, or uplink towards the backbone network. When no more data need to be transmitted or when there are momentarily no more packets to send, the link is disconnected. The packet-switched network can delay the removal of the link for a little time, typically for a: few hundred milliseconds. This is wise if packet transmission of newly arrived packets is to be continued or if a communications link in the other direction is to be established immediately after transmission in the previous direction ceases. The transmission of newly arrived packets or establishment of a new communications link in the other direction is quicker if the dedicated channel reserved for the previous communications link is still available, as opposed to that a new communications link has to be established from scratch through a common control channel in the network. In data transfer applications, the establishment of a new communications link in the other direction usually succeeds without problems because a computer can make a quick decision about a new communications link. If human reaction/action is required for the establishment of a new communications link, the arrangement usually will not work, because the time reserved for the decision-making is not long enough and the previous dedicated connection will be terminated.

One possible way of handling a voice connection between two or more persons over a packet-switched network is PoC (Push to talk over Cellular) the procedures of which are under development and standardization at present. The participants in a PoC session can receive non-voice data. Speech is interactive: speakers take turns randomly in a conversation, we can talk of discrete talk spurts. As one person stops talking and another one starts in his turn, there is a reaction time involved in this changeover, which may result in a situation where the dedicated channel reserved for the previous talk spurt is already released before the talk spurt of the other speaker starts. The release of the previous dedicated channel takes a few hundred milliseconds. After that, the dedicated channel needed must be established through a slower procedure by first employing the common control channel of the cellular network. This takes several hundred milliseconds. A similar problem occurs in conjunction with continuation of speech after a talk spurt. If the speaker wants to continue speaking and the link to the network has already been released, a new link must be established using the common control channel. If the release of the link is delayed, continuation of speech can occur more smoothly by just inserting new packets in the transmit buffer.

FIG. 1a shows an example case in which a terminal is receiving voice packets 1a, 2a and 3a. The voice packets end at packet 3a. After that, in a few hundred milliseconds, 4a, the dedicated channel is released. If the user of this terminal starts to speak only after that, which is probable, considering human reaction time, a new dedicated channel has to be set up for the terminal. The delay in setting up this new dedicated channel in accordance with the prior art is perceived by the users of terminals as an undesirable delay.

SUMMARY OF THE INVENTION

An object of the invention is to provide a procedure through which, in packet-switched cellular networks in which a dedicated channel is maintained only for connections having traffic, the establishment of a new voice communications connection can be speeded up after the end of a received talk spurt and in the case of a speaker continuing to speak. In the procedure according to the invention, the removal of the dedicated channel is delayed after a completed talk spurt so that the other party (the party that had been listening) will have time to react to the end of the talk spurt of the other speaker before the dedicated channel is released. This way, the voice connection needed in t the other transmission direction will be established through said dedicated channel much faster than by using a common control channel in a connection set-up procedure. The procedure according to the invention also facilitates quicker continuation of speech in the case where the transmitting party wants to go on speaking. Then, as the link is still up, the new packets to be transmitted can be sent out to the transmission path direct, without a separate request.

The objects of the present invention are achieved by a method in which post-speech packets according to the invention are transmitted on a given dedicated channel of a packet-switched network after the end of a talk spurt of a voice connection. These post-speech packets advantageously increase the time available to both the transmitting and listening party for reacting, so that more likely they will have time to start their talk spurt before the dedicated channel is released. This dedicated channel, which was already in use, can thus be utilized to start the establishment of a link for transmission in a new direction or to continue the speech transmission from the previous speaker.

An advantage of the invention is that it can be used to speed up the establishment, after a talk spurt, of a dedicated channel to be set up in the other transmission direction for calls made in packet-switched networks, as well as to speed up the continuation of speech by the previous speaker.

Another advantage of the invention is that the post-speech packets according to the invention can convey other information concerning the current call or session to the participants.

The invention is characterized by that which is specified in the independent claims.

Some preferred embodiments of the invention are specified in the dependent claims.

The basic idea of the invention is as follows: When using a packet-switched cellular network in which a dedicated channel is maintained only for connections having traffic for voice communication between two or more people, post-speech packets according to the invention are appended after each talk spurt to the data packets sent to the listening party. These post-speech packets increase the up-time of the dedicated channel so that the sender will have more time to react and continue his current turn to speak and the recipient will have more time to react to the end of the talk spurt from the previous speaker. Now, the second speaker can start his talk spurt at a moment when the setting up of the new link, in the opposite direction, still can be done through the dedicated channel used by the previous link. The setting up of the new link need not now be started by first contacting the common control channel of the cellular network which always increases the delay involved in the establishment of a connection. Post-speech packets can be advantageously inserted in the data stream by an element in the core network. Advantageously these post-speech packets may include any additional information needed by users of the voice connection.

BRIEF DESCRIPTION OF THE DRAWINGS

The invention will be described in detail below. The description refers to the accompanying drawings in which.

DETAILED DESCRIPTION

Figure 1A:
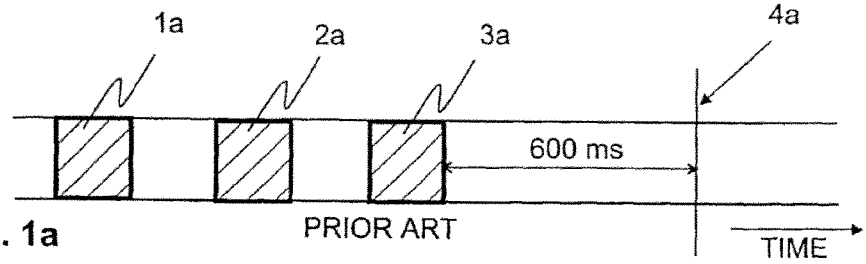
FIG. 1a shows an exemplary time chart describing the release of a dedicated channel according to the prior art.
Figure 1B:
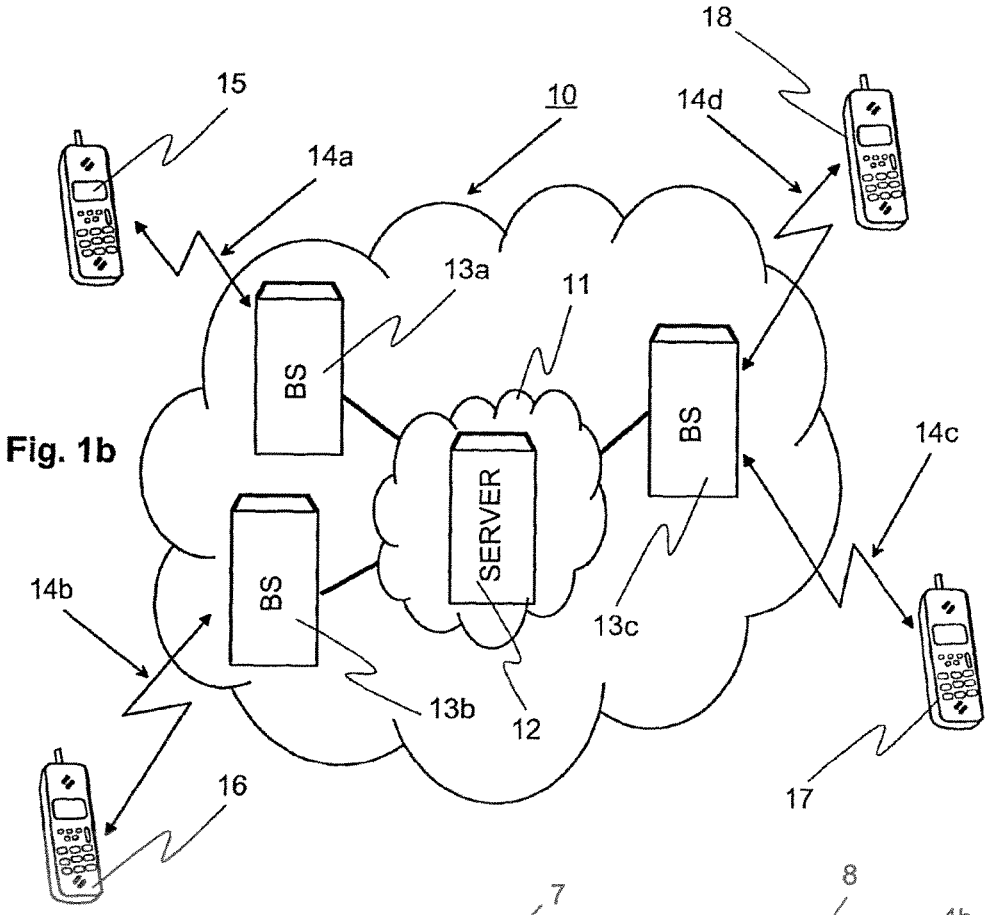
FIG. 1b shows, as an example, a packet-switched cellular network.

FIG. 1b shows, as an example, a cellular network 10 utilizing packet-switched communication. The network described in FIG. 1b may be a GPRS network, for instance. The network includes terminals 15, 16, 17 and 18 which communicate, when required, through a dedicated radio channel 14a, 14b, 14c and 14d with a base station BS 13a, 13b and 13c in the cellular network. In addition to base stations BS the network further includes other elements 11. An exemplary network element 11 shown in FIG. 1b advantageously comprises exchanges, nodes and various registers. Moreover, the element 11 may comprise elements 12 realizing different server functions either as standalone units or as parts of some other element in the network.

In the example illustrated in FIG. 1b, advantageously at least two terminals, e.g. terminals 15 and 18, are communicating with each other. The communication connection used by them may be e.g. a PoC session in a GPRS network. In this example, terminal 15 is the transmitting terminal, and terminal 18 is the receiving terminal. There may be, however, more terminals, such as terminals 16 and 17, connected to the same session. In the example of FIG. 1b, communication involves at least transmission of speech samples from the transmitting terminal 15 to the receiving terminal 18. From the transmitting terminal 15 an uplink 14a has been set up to the serving base station 13a. From the base station 13a speech samples are taken via a server element 12, which is one of the network elements 11, to a base station 13c serving the receiving terminal 18, from which base station 13c there is a downlink 14d to the receiving terminal 18.

The invention concerns a situation in which the speech samples from the transmitting terminal 15 come to an end. Advantageously the transmitting terminal 15 sends after the last speech sample some additional packets which indicate that the speech sample ended. In operation according to the prior art, all dedicated channels/links 14a and 14d are released according to a Temporary Block Flow (TBF) procedure, as shown in FIG. 1a. Now, if terminal 18, for example, needs to send speech samples after the release of the dedicated channel, a new dedicated channel has to be established through the common control channel which in this example includes a new uplink from terminal 18 and a new downlink to terminal 15. These link set-ups require several hundred milliseconds per link, which time may be noticeable to the users as an inconvenient delay.

Figure 1C:
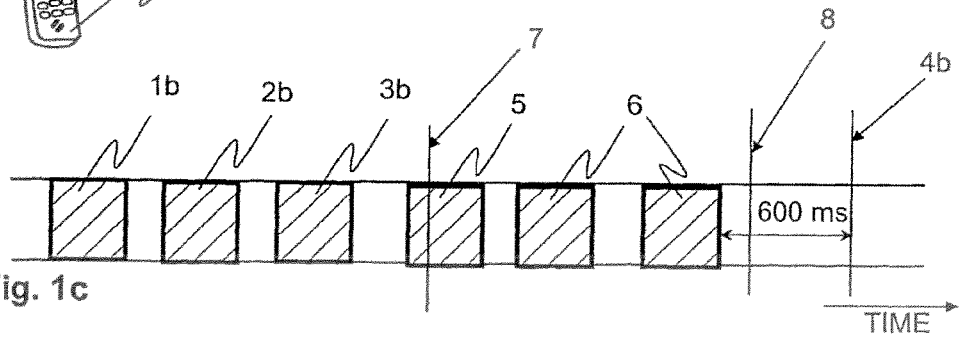
FIG. 1c shows an exemplary time chart describing the release of a dedicated channel according to the invention.

A method according to a first embodiment of the invention speeds up and improves the establishment of a new dedicated channel in a manner described in FIG. 1c. A server element 12 which may be part of any component 11 in the core network, participates in the transmission of data packets 1b, 2b, 3b by directing them from the sender 15 to the recipient 18. Such an intermediate server element 12 may be a router server, for example. This server/server element 12 notices that after the speech packets 1b, 2b, 3b terminal 15 sent a supplementary packet 5 indicating an end of speech samples. Then the router server 12 advantageously appends post-speech packets 6 according to the invention to said supplementary packets to extend the up-time of the dedicated channel used The post-speech packets 6 advantageously contain some information which either controls or helps the operation of terminals participating in the session. Naturally, the post-speech packets 6 may be just simple dummy packets. However, these post-speech packets 6 always have to be distinguishable from the actual received speech samples at the recipient's terminal.

The router server 12 in the core network transmits post-speech packets according to the invention advantageously for a time so long that the TBF link removal delay and the post-speech packets according to the invention together make a delay of about 2 to 3 seconds before the (downlink) dedicated communication channel is released, reference designator 4b. In practice this means that post-speech packets according to the invention are transmitted for 1 to 2 seconds. If the TBF procedure terminates the dedicated channel after about 600 ms from the last transmitted data packet, then in the method according to the invention there has to be sent 5 to 10 post-speech packets according to the invention at intervals of 500 to 600 ms. The dedicated channel will thus not be released and it can be used in establishing the dedicated channel in the other, uplink, direction.

The setting-up of a new dedicated channel can be started after the time point represented by reference designator 7 in FIG. 1c because it is then that the receiving terminal 18 is signaled about the end of speech packets. Using the method according to the invention the establishment of the dedicated channel in the other link direction is completed at a time point marked by reference designator 8, about 200 to 300 ms from the moment that the receiving party responded to the end of reception.

The receiving terminal, in this example terminal 18, can distinguish between the received supplementary packets 5 and post-speech packets 6 on the one hand and the speech sample packets 1b, 2b, 3b on the other hand. Advantageously the terminal 18 gives an audio signal to the user after packet 5 which indicates the end of speech, at a point indicated by reference designator 7. However, with the method according to the invention, the downlink 14d remains functional for a time of such duration, reference designator 4b, that the user of the terminal 18 has time to start his talk spurt before the downlink 14d is removed. Therefore, the setting-up time of the uplink to be established can be shortened by utilizing this downlink, about 200 ms, reference designator 8 in FIG. 1c.

In the method according to the invention, the router server 12 in the core network sends post-speech packets 6 advantageously to all terminals connected to the session, i.e. also to terminal 15 which transmitted the speech samples 1b, 2b, 3b in this example. This is to make sure that a link can be established from base station 13a to terminal 15, which link can be employed in setting up a possible new uplink from terminal 15 towards base station 13a. Preparing for the establishment of a new uplink requires a longer delay than that required for just ensuring the continuation of the existence of the downlink. This is due to the fact that termination delay begins earlier in the uplink than in the downlink and, moreover, the first speech packets from the other terminal arrive only after a small delay. All this time, the downlink towards the terminal that was using the uplink must be kept up using the method according to the invention so that the potential establishment of a new uplink can be performed quickly.

In a method according to a second embodiment of the invention, post-speech packets 6 according to the invention are not sent to terminal 15 which transmitted the speech samples. In that case the uplink 14a from terminal 15 is allowed to terminate according to the prior art and, if necessary, a new downlink is established towards that terminal 15 using a method according to the prior art. There is no need to wait for the arrival of the first speech sample packets from the new sending terminal 18 at terminal 15, but it suffices that the new uplink from terminal 18 to base station 13c can be established quickly in about 200 ms using the method according to the invention. With this method it is possible, if required, to reduce the overall delay in the method according to the invention to keep the previous dedicated channel component, the downlink, in use.

In a method according to a third embodiment of the invention, post-speech packets 6 are added already at the sending terminal 15. In that case few changes are needed in the operation of the network and it can operate according to the prior art and convey the transmitted packets from a terminal to another unchanged. The receiving terminals 16, 17 and 18 operate in a manner described in conjunction with the first embodiment, i.e. they can differentiate between the post-speech packets 6 and the speech sample packets 1b, 2b, 3b.

Figure 2:
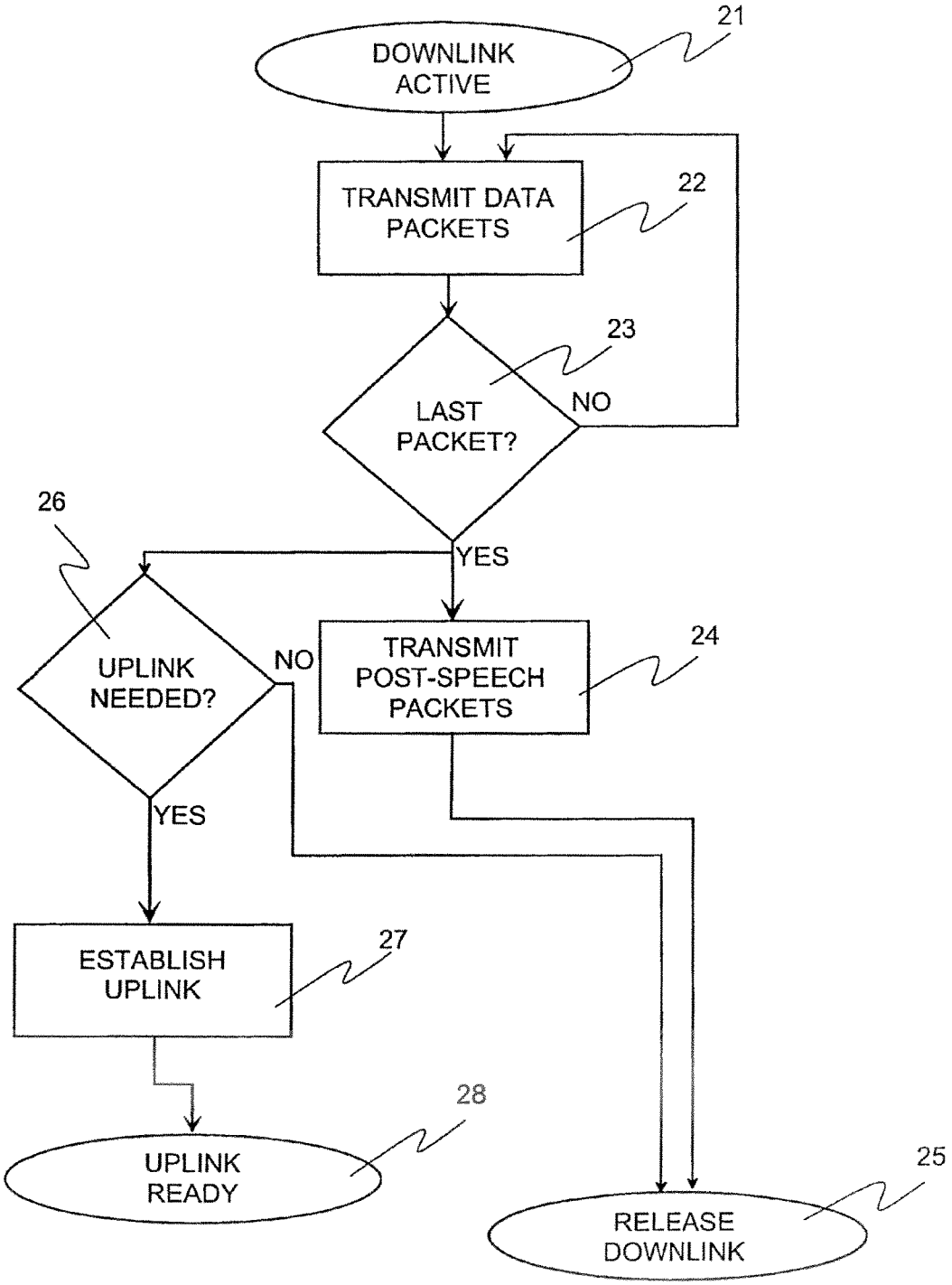
FIG. 2 shows an exemplary flow chart describing the utilization of the method according to the invention.

FIG. 2 shows in an exemplary flow chart the main stages of the method according to the invention. The exemplary flow chart in FIG. 2 mainly describes a method according to the first and second embodiments of the invention. Initially, state 21, a downlink has been established from the network 10 to a terminal. A server/server element 12, such as router server, in the core network sends forward in step 22 a data packet, such as packet 1b in FIG. 1c, received from another terminal. In step 23 it is checked whether this is the final data packet received from said another terminal. If not, the process returns to step 22 where the network server 12 sends forward the next data packet, packet 2b in the example of FIG. 1c.

At some point of time the router server 12 sends forward a speech sample packet which indicates that speech samples from the aforementioned another terminal are now exhausted. In the example of FIG. 1c this means the supplementary packet 5. Having received this supplementary packet 5 the server 12 observes the situation and starts advantageously two separate processes.

The first process is as follows. Post-speech packets 6 according to the invention are appended by the router server 12 to the transmitted speech sample packets so as to produce a delay of desired length, step 24. This keeps at least the downlink towards the receiving terminal in existence. It is also possible to have post-speech packets according to the invention sent also to the terminal from which the data packets proper originated. In that case the uplink also remains in existence.

In both of these options the server sends advantageously 5 to 10 post-speech packets 6 according to the invention at about 500-ms intervals. This produces a sufficient delay after the last speech sample packet 3b proper, prior to the release of the links used, which in FIG. 1c refers to the point of time 4b. When about 600 milliseconds have passed after the transmission of the last post-speech packet according to the invention, the links used are released in a procedure according to the prior art, step 25.

Simultaneously with the first process, a second process is advantageously started as well. In that process it is determined, in step 26, whether some terminal, which earlier had been receiving only, needs an uplink. If not, nothing needs to be done, and the process ends up at step 25 in which the links used are released. If, however, it is found out in step 26 that a terminal needs an uplink, that uplink can be set up utilizing the still-functional downlink towards said terminal. This has been accomplished at a point of time 8 in the example of FIG. 1c. This way, the new uplink is established in about 200 ms from the moment at which it was detected that it is needed. Thus the process conies to step 28 in which a new uplink is functional between a given terminal and the network.

In the method according to a third embodiment of the invention steps 23 and 24 are performed already at the transmitting terminal. Thus the network serves only as a relay element between two or more terminals, and the server function described above need not be utilized just for the invention.

Figure 3:
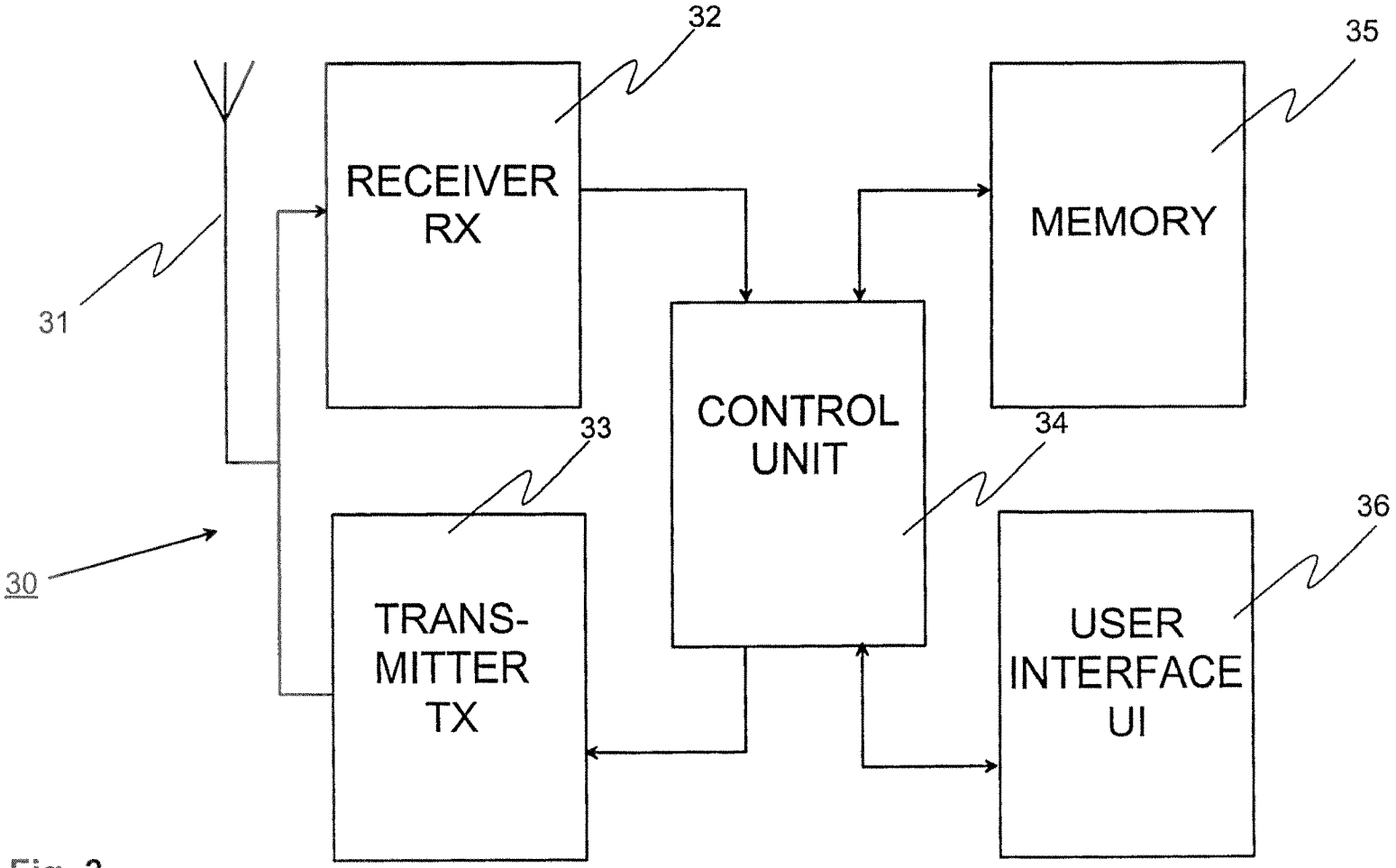
FIG. 3 shows, as an example, a cellular terminal capable of employing the method according to the invention.

FIG. 3 shows, as an example, the main component parts of a wireless terminal 30 in an arrangement according to the invention. The terminal 30 utilizes an antenna 31 in the transmission and reception of packets. Reference designator 32 represents the means constituting a receiver RX by which the wireless terminal 30 receives packets from a cellular network 10. The receiver RX comprises means according to the prior art for all received packets.

Reference designator 33 represents the means that constitute the transmitter TX in the wireless terminal. The transmitter means 33 perform on the signal to be transmitted all the necessary signal processing measures required when communicating with a cellular network 10.

From the point of view of the invention, the crucial functional unit in the terminal is the control unit 34 which controls the operation of the terminal 30. It controls the operation of all the main component parts belonging to the terminal 30. It controls both reception and transmission. It is further used to control the user interface UI 36 and the memory 35. In the arrangement according to the invention, the control unit 34 determines whether it is data packets containing speech samples or post-speech packets according to the invention that are received at a given moment. Furthermore, it is the control unit 34 that decodes the received post-speech packets according to the invention if they convey information to the user of the terminal. If, in accordance with the third embodiment of the invention, post-speech packets are appended to the speech sample data packets already at the terminal, this procedure is controlled by the control unit 34.

The software application required by the control unit 34 in the decoding and transmission of packets according to the invention advantageously resides in the memory 35.

The user interface UI 36 is utilized in controlling the functions of the terminal.

On the network 10 side, operation according to the invention is maintained by a server/server function 12. The software application required for the method according to the invention is advantageously stored at a router server 12.

Some preferred embodiments according to the invention were described above. The invention is not limited to the embodiments just described. The inventional idea can be applied in numerous ways within the scope defined by the attached claims.

The invention claimed is:

1. A method, comprising:

communicating in a cellular communications network through a dedicated channel comprising both an uplink and a plurality of downlinks;

controlling a flow of data packets by at least one of a server function in a core network and a server in the core network, wherein the core network does not include a base station; and keeping up the dedicated channel after a last speech sample packet is sent downlink from the core network by sending post-speech packets for a time of such duration that a new uplink can be established utilizing at least one downlink from the core network, wherein the at least one of the server function and the server in the core network transmits the post-speech packets to the plurality of downlinks responsive to a packet indicating an end of speech samples from the uplink, wherein at least one post-speech packet includes information intended for a user of at least one receiving terminal, and wherein post-speech packets are also sent to a terminal that used the uplink.

2. The method according to claim 1 wherein the keeping up of the dedicated channel comprises:

the at least one of the server function and the server determining when the last speech sample packet is sent;

the at least one of the server function and the server sending at least one post-speech packet downlink to receiving terminals; and determining whether a terminal taking part in a session needs a new uplink; and establishing said new uplink.

3. The method according to claim 2 wherein each of the receiving terminals additionally signals the user of the terminal after receiving the last speech sample packet.

4. The method according to claim 2 wherein said post-speech packets are sent downlink 5 to 10 times at intervals of 500 ms at most.

5. The method according to claim 4 wherein after a last post-speech packet the downlink used is released after a delay specific to a cellular network.

6. The method according to claim 1 wherein the dedicated channel used is kept up in such a manner that at least one post-speech packet is appended to a last speech packet received by the at least one of the server function and the server.

7. An apparatus, comprising:

a control unit; and a memory including software, where the memory and the software are configured, with the control unit, to cause the apparatus at least to:

receive a last speech sample packet from an uplink in a cellular communications network; and prolong an existence of downlinks by sending post-speech packets to a plurality of downlinks for a time of such duration that at least one new uplink can be established from a receiving terminal, wherein the post-speech packets are sent to the plurality of downlinks responsive to a packet indicating an end of speech sample from the uplink, and wherein at least one of the post-speech packets includes information intended for a user of at least one terminal connected to the apparatus, and wherein post-speech packets are also sent to a terminal that used the uplink, wherein the apparatus comprises at least one of a server function and a server in a core network associated with the cellular communications network, wherein the core network does not include a base station.

8. The apparatus according to claim 7, where the memory and the software are configured, with the control unit, to cause the apparatus to prolong the existence of a downlink by sending the post-speech packets to the at least one terminal connected to the apparatus.

9. The apparatus according to claim 8, where the memory and the software are configured, with the control unit, to cause the apparatus to send 5 to 10 post-speech packets at intervals of 500 ms at most.

10. An apparatus, comprising:

a control unit; and a memory including software, where the memory and the software are configured, with the control unit, to cause the apparatus to at least one of recognize or transmit post-speech packets, with at least one of a server function in a core network and a server in the core network, on a packet data channel responsive to a packet indicating an end of speech samples, wherein the core network does not include a base station, wherein at least one post-speech packet of the post-speech packets includes information intended for a user of at least one receiving terminal, and wherein the at least one receiving terminal to which post speech packets are transmitted comprises a terminal on an uplink.

11. The apparatus according to claim 10, where the memory and the software are configured, with the control unit, to cause the apparatus to perform signaling after receiving a last speech sample packet.

12. The apparatus according to claim 10, where the recognized post-speech packets are appended to speech sample packets.

13. A cellular communications network comprising:

at least one network element; and a memory including software, where the memory and the software are configured, with the at least one network element, to at least maintain a dedicated channel between a plurality of terminals of the cellular communications network by sending with the at least one network element, responsive to a last speech packet from a sending terminal, post speech packets to a plurality of receiving terminals for a time of such duration that a new dedicated channel can be established utilizing said earlier dedicated channel, wherein the at least one network element is of a core network associated with the cellular communications network, wherein the core network does not include a base station, wherein at least one post-speech packet of the post-speech packets includes information intended for a user of at least one terminal connected to the dedicated channel, and wherein post-speech packets are also sent to a terminal that used the uplink.

14. The cellular communications network according to claim 13, where said dedicated channel in the cellular communications network is maintained by sending the post-speech packets, after a last speech packet transmitted, to the at least one terminal connected to the dedicated channel.

15. The cellular communications network according to claim 14, where the at least one network element is a server function in the core network.

16. The cellular communications network according to claim 15, where the server function is incorporated in a router server of the core network.

17. The cellular communications network according to claim 13, where the at least one network element comprises a terminal ending its transmission.

18. The cellular communications network according to claim 13 wherein the dedicated channel is maintained by sending 5 to 10 post-speech packets at intervals of 500 ms at most.

19. The cellular communications network according to claim 18 wherein after a last post-speech packet said earlier dedicated channel is arranged to be released after a delay specific to the network.

20. A non-transitory data storage memory encoded with software readable by a data processing device for performing actions for continuing the existence of a dedicated channel in a packet-switched cellular communications network, the actions comprising:

determining, with at least one of a server function and a server in a core network associated with the packet-switched cellular communications network, when a last speech sample packet is sent uplink and sending at least one post-speech packet to a plurality of receiving terminals responsive to the last speech sample packet, wherein the core network does not include a base station, wherein the at least one post-speech packet includes information intended for a user of at least one receiving terminal of the plurality of receiving terminals, wherein post-speech packets are also sent to a terminal that used the uplink, and determining whether a receiving terminal taking part in a session needs a new uplink, and establishing said uplink.

21. A non-transitory computer readable memory encoded with a computer program executable by a processor to perform actions comprising:

communicating in a cellular communications network through a dedicated channel comprising both an uplink and a plurality of downlinks;

controlling a flow of data packets by at least one of a server function and a server in a core network associated with the cellular communications network, wherein the core network does not include a base station;

keeping up the dedicated channel responsive to a last speech sample packet sent downlink from the core network by sending post-speech packets for a time of such duration that a new uplink can be established utilizing at least one downlink from the core network; and transmitting the post-speech packets to the plurality of downlinks after receiving a packet indicating an end of speech sample from the uplink, wherein at least one post-speech packet of the post-speech packets includes information intended for a user of a receiving terminal connected to the dedicated channel, and wherein post-speech packets are also sent to a terminal that used the uplink.

22. The computer readable memory encoded with a computer program according to claim 21, wherein the keeping up of the dedicated channel comprises:

determining when the last speech sample packet is sent;

sending the at least one post-speech packet downlink to receiving terminals;

determining whether the receiving terminal taking part in a session needs a new uplink; and establishing said new uplink.

23. The computer readable memory encoded with a computer program according to claim 22, wherein each of the receiving terminals additionally signals a user of the terminal after receiving the last speech sample packet.

24. The computer readable memory encoded with a computer program according to claim 22 wherein said post-speech packets are sent downlink 5 to 10 times at intervals of 500 ms at most.

25. The computer readable memory encoded with a computer program according to claim 24 wherein after a last post-speech packet the downlink used is released after a delay specific to the cellular communications network.

26. The computer readable memory encoded with a computer program according to claim 21 wherein the dedicated channel used is kept up in such a manner that at least one post-speech packet is appended to a last speech packet received by the at least one of the server function and the server.

*27. An apparatus, comprising:*

*a control unit; and*

*a memory including software, where the memory and the software are configured, with the control unit, to cause the apparatus to:*

*receive post-speech packets from at least one of a server function in a core network and a server in the core network, wherein the core network does not include a base station;*

*send at least one packet indicating an end of speech samples towards the at least one of the server function and the server in the core network, wherein at least one post-speech packet of the post-speech packets includes information intended for a user of at least one receiving terminal, wherein the sending of the at least one packet*

*is indicative of a time that a new dedicated channel can be established by at least one user equipment.*

*28. The apparatus according to claim 27, wherein the at least one packet comprises an indication to the at least one receiving terminal of the end of speech samples.*

*29. A method, comprising:*

*receiving post-speech packets from at least one of a server function in a core network and a server in the core network, wherein the core network does not include a base station;*

*sending at least one packet indicating an end of speech samples towards the at least one of the server function and the server in the core network, wherein at least one post-speech packet of the post-speech packets includes information intended for a user of at least one receiving terminal, wherein the sending of the at least one packet is indicative of a time that a new dedicated channel can be established by at least one user equipment.*

*30. The method according to claim 29, wherein the at least one packet comprises an indication to the at least one receiving terminal of the end of speech samples.*

*31. An apparatus, comprising:*

*a control unit; and*

*a memory including software, where the memory and the software are configured, with the control unit, to cause the apparatus to:*

*receive post-speech packets from at least one of a server function in a core network and a server in the core network, wherein the core network does not include a base station;*

*send at least one packet indicating an end of speech samples towards at least one receiving terminal, wherein at least one post-speech packet of the post-speech packets includes information intended for a user of the at least one receiving terminal, wherein the at least one packet comprises an indication to the at least one receiving terminal of a time that a new dedicated channel can be established by at least one user equipment, wherein the sending of the at least one packet is indicative of a time that a new dedicated channel can be established by at least one user equipment.*

*32. A method, comprising:*

*receiving post-speech packets from at least one of a server function in a core network and a server in the core network, wherein the core network does not include a base station;*

*sending at least one packet indicating an end of speech samples towards at least one receiving terminal, and wherein at least one post-speech packet of the post-speech packets includes information intended for a user of the at least one receiving terminal, wherein the sending of the at least one packet is indicative of a time that a new dedicated channel can be established by at least one user equipment.*

* * * * *